(12) United States Patent
Cunningham et al.

(10) Patent No.: US 10,624,315 B2
(45) Date of Patent: Apr. 21, 2020

(54) FUNCTIONAL GARMENTS TO COLLECT LOOSE HAIR AND SKIN OF DOMESTIC PETS

(71) Applicants: Victoria N. Cunningham, Belleville, MI (US); Frazier Cunningham, III, Belleville, MI (US); Cindita D. Cunningham, Belleville, MI (US)

(72) Inventors: Victoria N. Cunningham, Belleville, MI (US); Frazier Cunningham, III, Belleville, MI (US); Cindita D. Cunningham, Belleville, MI (US)

( * ) Notice: Subject to any disclaimer, the term of this patent is extended or adjusted under 35 U.S.C. 154(b) by 0 days.

(21) Appl. No.: 16/007,906

(22) Filed: Jun. 13, 2018

(65) Prior Publication Data
US 2018/0288970 A1 Oct. 11, 2018

Related U.S. Application Data

(63) Continuation-in-part of application No. 14/943,773, filed on Nov. 17, 2015, now abandoned.

(60) Provisional application No. 62/080,778, filed on Nov. 17, 2014.

(51) Int. Cl.
| | |
|---|---|
| *A01K 13/00* | (2006.01) |
| *B32B 25/10* | (2006.01) |
| *B32B 25/12* | (2006.01) |
| *B32B 3/10* | (2006.01) |
| *B32B 3/30* | (2006.01) |

(52) U.S. Cl.
CPC ............ *A01K 13/006* (2013.01); *A01K 13/00* (2013.01); *A01K 13/002* (2013.01); *A46B 2200/1093* (2013.01); *B32B 3/10* (2013.01); *B32B 3/30* (2013.01); *B32B 25/10* (2013.01); *B32B 25/12* (2013.01); *B32B 2437/00* (2013.01)

(58) Field of Classification Search
CPC .... A01K 13/006; A01K 13/001; A01K 13/00; A01K 27/002; A01K 15/04; A01K 15/00; A01K 1/0263
USPC .................................................. 119/602, 850
See application file for complete search history.

(56) References Cited

U.S. PATENT DOCUMENTS

| | | | | |
|---|---|---|---|---|
| 6,481,383 B1* | 11/2002 | Ross | .................... | A01K 13/006 119/850 |
| 2010/0277945 A1* | 11/2010 | Hurwitz | ............... | A01K 13/003 362/570 |
| 2013/0025542 A1* | 1/2013 | Gutierrez | ............... | A01K 13/00 119/600 |
| 2014/0083373 A1* | 3/2014 | Hoffmann | ............ | A01K 13/006 119/850 |

\* cited by examiner

*Primary Examiner* — Peter M Poon
*Assistant Examiner* — Jeffrey R Larsen
(74) *Attorney, Agent, or Firm* — Young Basile Hanlon & MacFarlane, P.C.

(57) ABSTRACT

A multi-layered animal garment is configured to aid shedding of fur from an animal. The garment includes a fur agitation layer comprising a plurality of fur agitation features to facilitate the shedding as the fur agitation layer moves relative to the fur and a mesh layer configured to retain fur pieces shed from the fur. Each layer includes at least one leg band configured to be attached to a leg of the animal. The fur agitation layer and the mesh layer are elastically connected to each other. The leg band of the fur agitation layer and the leg band of the mesh layer cause the fur agitation layer and the mesh layer to move in relation to each other.

20 Claims, 10 Drawing Sheets

FUNCTIONAL GARMENTS TO COLLECT LOOSE HAIR AND SKIN OF DOMESTIC PETS

CROSS REFERENCE TO RELATED APPLICATIONS

This disclosure is a continuation-in-part of U.S. patent application Ser. No. 14/943,773 filed on Nov. 17, 2015 which claims the benefit of U.S. Provisional Application No. 62/080,778 filed on Nov. 17, 2014, both of which are hereby incorporated by reference.

TECHNICAL FIELD

This disclosure is related to wearable, functional garments for domestic pets such as dogs, which garments comfort the animal, aid in shedding and collect and contain shed hair or fur.

BACKGROUND

The statements in this section merely provide background information related to the present disclosure. Accordingly, such statements are not intended to constitute an admission of prior art.

The bond between humans and their domesticated animals, like dogs and cats, is more intense than bonds with other species. Dogs and cats evolved from wild animals as a direct result of human intervention. Humans selected these animals to be our companions, to hunt with us and to protect us. Most domesticated animals like dogs and cats depend solely on humans for their care. Humans are responsible for meeting their animals' needs, both physical and emotional.

Humans live in close proximity to their domesticated animals, with many dogs and cats living in their caretakers' homes. Dogs and cats shed their hair or fur, and the shed fur can cause or exacerbate allergies and asthma in humans.

SUMMARY

A multi-layered animal garment is configured to aid shedding of fur from an animal. The garment includes a fur agitation layer comprising a plurality of fur agitation features to facilitate the shedding as the fur agitation layer moves relative to the fur and a mesh layer configured to retain fur pieces shed from the fur. Each layer includes at least one leg band configured to be attached to a leg of the animal. The fur agitation layer and the mesh layer are elastically connected to each other. The leg band of the fur agitation layer and the leg band of the mesh layer cause the fur agitation layer and the mesh layer to move in relation to each other.

BRIEF DESCRIPTION OF THE DRAWINGS

One or more embodiments will now be described, by way of example, with reference to the accompanying drawings, in which:

FIG. 12 illustrates the mesh layer in side view;
FIG. 13 illustrates the mesh layer from a rear view;
FIG. 14 illustrates the fur agitation layer;
and
FIG. 15 illustrates both layers in a rear view.

FIG. 16 illustrates a mesh layer configured to rest close to the animal's fur with two leg attachments connecting to rear legs of the animal; and FIG. 17 illustrates a fur agitation layer resting above the mesh layer with two leg attachments connecting to front legs of the animal.

DETAILED DESCRIPTION

Figure 1:
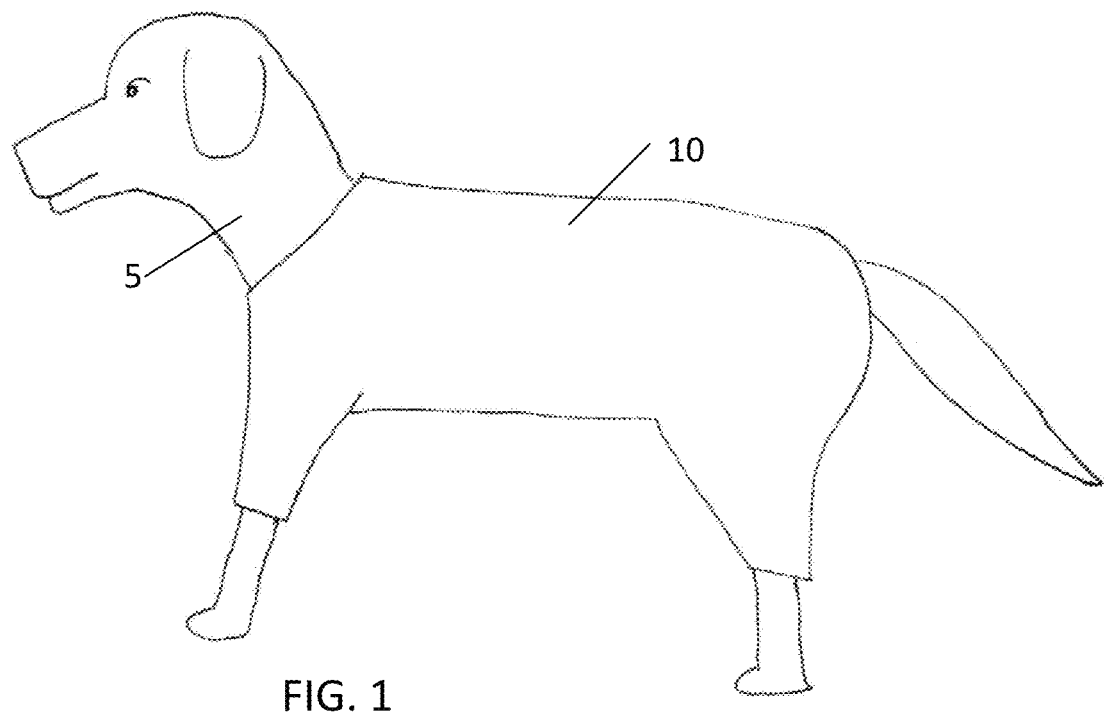
FIG. 1 illustrates an exemplary embodiment of a multi-layered functional garment for domesticated animals, with a first layer including a loose fur retaining mesh and a second layer including a fur agitation feature, in accordance with the present disclosure.

Human domesticated small mammals such as dogs and cats thousands of years ago. Even today, dogs, cats and other small domesticated mammals live in close proximity to or in the homes of their human companions and caretakers.

One characterizing feature of mammals is the presence of hair on the body. Many mammals, including domesticated dogs and cats, undergo the process of shedding their hair or fur. Shed hair or fur can cause problems ranging from minor nuisance to severe allergies and asthma in humans. Because humans live in such close proximity to domesticated dogs and cats, it is desirous to have the ability to hasten shedding and to collect and contain shed hair or fur.

Hair grows in cycles. Each hair follicle undergoes period of rapid growth, followed by slower growth and a resting phase. During the resting phase, mature hair remains in the follicles and eventually detaches at the base. When a dog or cat sheds her coat, a young hair pushes out the old hair and the cycle begins anew.

Although shedding is a normal process for dogs and cats, the amount and frequency of hair that is shed often depends upon their health and breed type, and can also depend on the season. Many dogs develop thick coats in the winter that are then shed in the spring. Dogs that are always kept indoors, however, are prone to smaller fluctuations in coat thickness and tend to shed fairly evenly all year.

The seasonal length of daylight governs when a dog sheds her coat. Longer periods of daylight in spring activate a shedding process that lasts four to six weeks. In fall, as daylight hours grow shorter, many dogs may again shed their coat.

Some dogs have a double coat comprised of long, coarse outer guard hairs and a soft, fine, woolly undercoat. Some breeds have a non-shedding curly coat. These breeds do not shed loose hair into the home. Instead, their loose hair tends to collect in mats that remain on the body. Dogs with softer hair and cats with longer hair are more prone to develop mats. Matted hair can be painful and may lead to underlying skin problems.

Grooming at regular intervals keeps a pet's coat and skin in good condition and prevents health problems for both animals and humans. The removal of shed hairs helps the hair in its renewal process. More importantly, grooming cleans the skin of dandruff, eliminates dry skin flakes and improves its insulation properties. In addition, grooming significantly decreases the amount of hair that may be ingested by cats, causing hairballs.

When grooming, it is important to choose to choose the correct brush or comb, with bristles or teeth the appropriate length and strength for the dog's coat. For example, if the coat is thick and the bristles or teeth are too short, the top coat may look smooth for a time but the undercoat will mat. On the other hand, if the dog has a thin undercoat, grooming with tools that have long bristles and teeth can scratch and injure the skin.

Some humans develop an immune reaction to allergens produced in the sebaceous glands of a dog's skin. Allergens are found in a dog's dander, minute scales of dead skin. Allergens are also present in a dog's saliva and urine, and are deposited on her fur when she licks herself. When the fur dries and sheds, the dander flakes off and becomes airborne, and can be inhaled or ingested by humans. Dog allergens also adhere to clothing, furnishings and walls.

Many domesticated animals find stroking or petting, as well as being enclosed in a snug, warm space, soothing or comforting. Humans, as caretakers and companions of their domesticated animals, have an interest in keeping their animals content and deepening the bond with them.

Referring now to the drawings, wherein the showings are for the purpose of illustrating certain exemplary embodiments only and not for the purpose of limiting the same, FIG. 1 illustrates an exemplary embodiment of a multi-layered functional garment for domesticated animals, with a first layer including a loose fur retaining mesh and a second layer including a fur agitation feature. Dog 5 is illustrated wearing a multi-layered garment 10 including at least a fur agitation layer configured to move relative to the fur and facilitate rapid loosening or shedding of fur and a second layer including a mesh configured to trap the shed fur and prevent the shed fur from falling to the ground.

Figure 2:
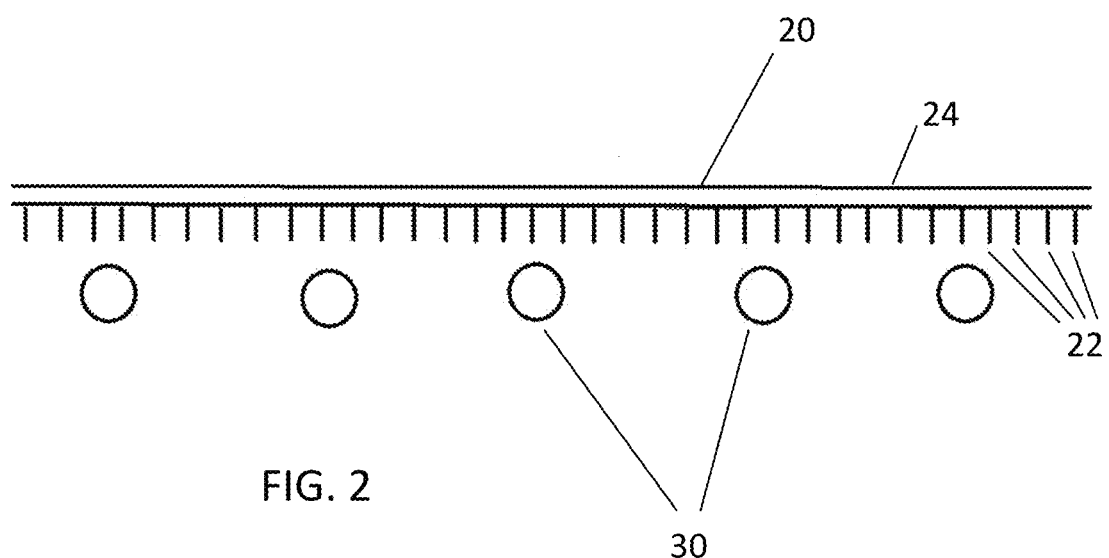
FIG. 2 illustrates exemplary layers of the garment of FIG. 1, including a mesh layer configured to be closest to the fur of the animal and a fur agitation layer resting above the mesh layer, in accordance with the present disclosure.

FIG. 2 illustrates exemplary layers of the garment of FIG. 1, including a mesh layer configured to be closest to the fur of the animal and a fur agitation layer resting above the mesh layer. Fur agitation layer 20 and mesh layer 30 are illustrated in profile, with mesh layer 30 being located closer to the fur of the animal than fur agitation layer 20. Mesh layer 30 included a plurality of fibers or strands secured together in a grid or net pattern and oriented perpendicularly to fur coat of the animal. Fur agitation layer includes a flexible base portion 24 and a surface of bristles 22 extending from portion 24 in the direction of the fur. In one embodiment, layer 20 can be similar to the hook layer of a Velcro mechanism, wherein the base portion comprises a cloth layer and instead of the polymerized strands being bent into a hook shape, the strands can be created extending straight from the base portion. In one embodiment, the bristles 22 can be close enough together that strands of mesh layer 30 cannot fit between the bristles 22, thereby facilitating easy relative movement of the layers and more interaction between the bristles 22 and the fur.

Figure 3:
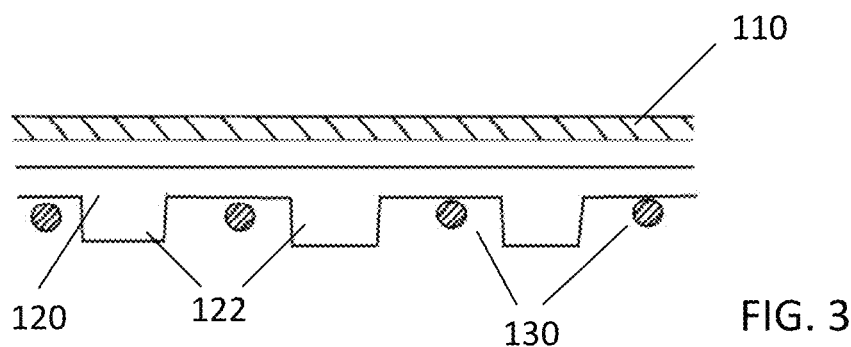
FIG. 3 illustrates an alternative embodiment of exemplary layers that can be configured within the garment of FIG. 1, including a fur agitation layer including a polymerized plate, in accordance with the present disclosure.

FIG. 3 illustrates an alternative embodiment of exemplary layers that can be configured within the garment of FIG. 1, including a fur agitation layer including a polymerized plate. Fur agitation layer 120 is illustrated including a polymerized plate with fur agitation features 122 formed thereupon. Strands of mesh layer 130 are illustrated fitting between the fur agitation features. An optional decorative layer 110 is illustrated located above or exterior to the other two layers. Any number of decorative or ornamental patterns can be used with layer 110. Movement of fur agitation layer 120 relative to the fur of the animal acts in accordance with the disclosure, promoting rapid shedding of fur.

The polymerized fur agitation layer 120 can be constructed of any flexible material that can be worn next to an animal's fur without irritating the animal. In one example, a material similar to known materials used in beach sandals or Crocs style shoes can be utilized. In another embodiment, a closed cell foam known in the art can be used. In another example, a rubber material such as latex can be used. A number of different flexible, non-toxic materials are envisioned for use in fur agitation layer 120, and the disclosure is not intended to be limited to the particular examples provided herein.

Figure 4:
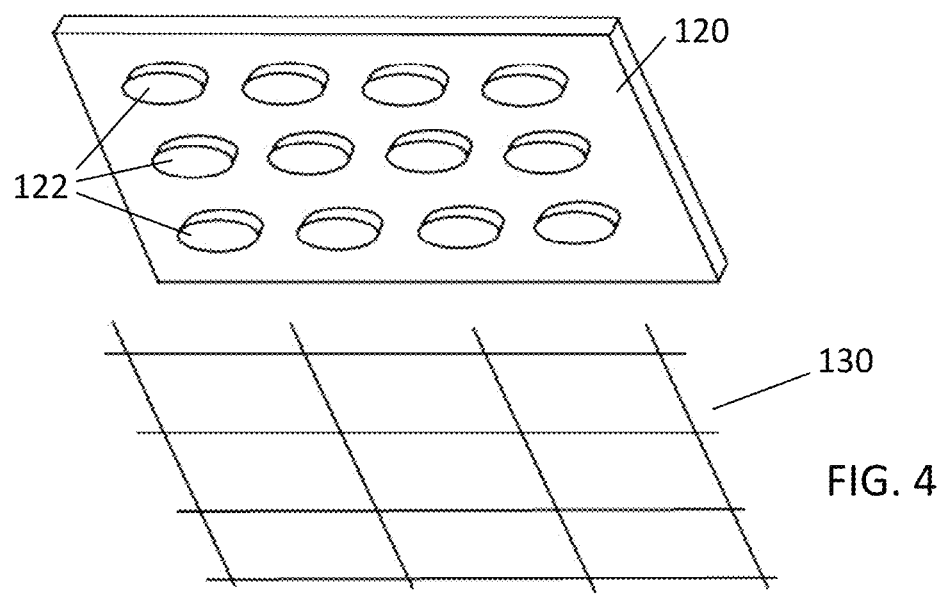
FIG. 4 illustrates the layers of FIG. 3 in detail, including a mesh layer sized to permit fur agitation features to penetrate through the mesh layer, in accordance with the present disclosure.

FIG. 4 illustrates the layers of FIG. 3 in detail, including a mesh layer sized to permit fur agitation features to penetrate through the mesh layer. Fur agitation layer 120 including fur agitation features 122 is illustrated. Mesh layer 130 is illustrated including a grid of strands forming the mesh. Mesh 130 is illustrated including a wide enough pattern that fur agitation features 122 can fit within the gaps in the mesh, such that features 122 can directly interact with the fur of the animal. Such direct interaction can facilitate rapid shedding of fur. Fur agitation features 122 are illustrated as short cylinders. It will be appreciated that the features can be many different shapes.

Figure 5:
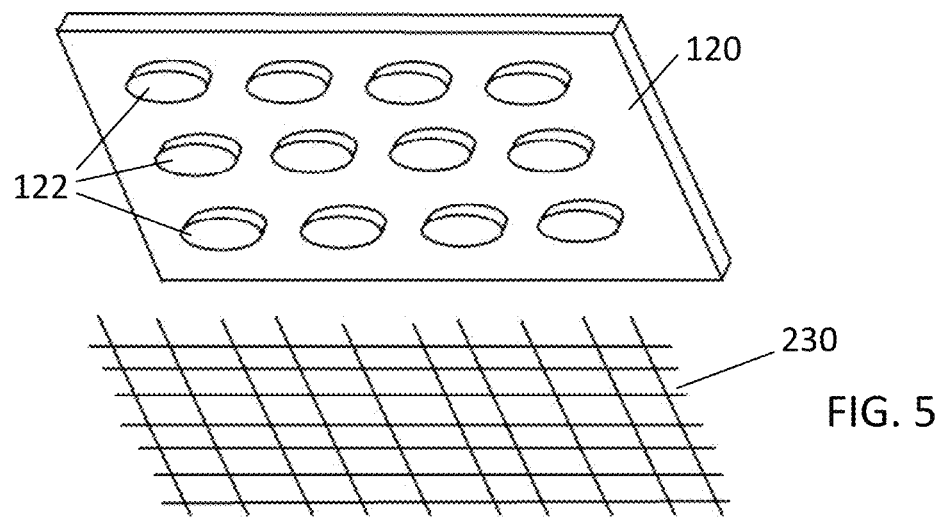
FIG. 5 illustrates an alternative to the layers of FIG. 4, including a mesh layer sized to prevent fur agitation features from penetrating through the mesh layer, in accordance with the present disclosure.

FIG. 5 illustrates an alternative to the layers of FIG. 4, including a mesh layer sized to prevent fur agitation features from penetrating through the mesh layer. Fur agitation layer 120 including fur agitation features 122 is illustrated. Mesh layer 230 is illustrated including a grid of strands forming the mesh. Mesh 230 is illustrated including a narrow pattern preventing fur agitation features 122 from fitting within the gaps in the mesh, such that features 122 cannot directly interact with the fur of the animal. Movement of layer 120 relative to the mesh layer 130 still creates friction with the fur and facilitates rapid shedding. Such a configuration can facilitate rapid shedding of fur while minimizing potential irritation of the animal. FIG. 5 is illustrated as a finely spaced grid pattern mesh. However, it will be appreciated that a wide variety of filters and particulate papers or pads can be used as a mesh layer in the place of a grid mesh in accordance with the disclosure. For example, a product known in the art as a Swiffer pad, a fibrous particulate cloth, can be used in place of mesh layer 130. Similarly, any material used in a vacuum filter, a lint filter, or any generally fibrous filter can be used as a mesh layer in accordance with the disclosure.

Figure 6:
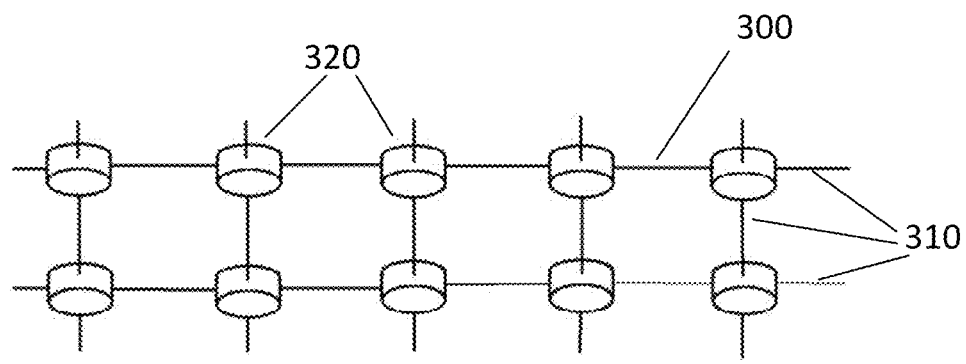
FIG. 6 illustrates an alternative embodiment of exemplary layers that can be configured within the garment of FIG. 1, including a first mesh layer and a second mesh layer including a plurality of polymerized beads attached to the second mesh layer, in accordance with the present disclosure.

FIG. 6 illustrates an alternative embodiment of exemplary layers that can be configured within the garment of FIG. 1, including a first mesh layer and a second mesh layer including a plurality of polymerized beads attached to the second mesh layer. Mesh layer 330 is illustrated. Mesh layer 300 is additionally illustrated including strands 310 arranged in a grid pattern. At some or all of the locations where the strands 310 overlap, polymerized beads 320 are formed as fur agitation features. The layers 300 and 330 can be arranged with either layer closer to the animal's fur. Beads 320 are illustrated as cylinder shapes. Any shapes including spheres and cubes can be used.

Figure 11:
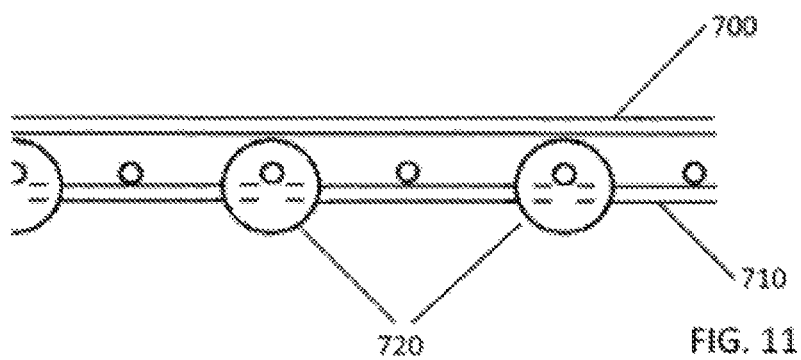
FIG. 11 illustrates an alternative embodiment of exemplary layers that can be configured within the garment of FIG. 1, including a fur agitation layer similar to the layer of FIG. 6 utilizing bead features located closest to the fur of the animal and a second mesh layer resting above the fur agitation layer, in accordance with the present disclosure.

FIG. 11 illustrates an alternative embodiment of exemplary layers that can be configured within the garment of FIG. 1, including a fur agitation layer similar to the layer of FIG. 6 utilizing bead features located closest to the fur of the animal and a second mesh layer resting above the fur agitation layer. Fur activation layer 710 is illustrated including a mesh with round beads 720 formed on a portion of the intersections of stands of the mesh. A second mesh layer 700 is illustrated resting above the fur activation layer 710. Mesh layer 700 is embodied in FIG. 11 as a fibrous material such as a Swiffer particulate pad or a filter material.

Figure 7A:
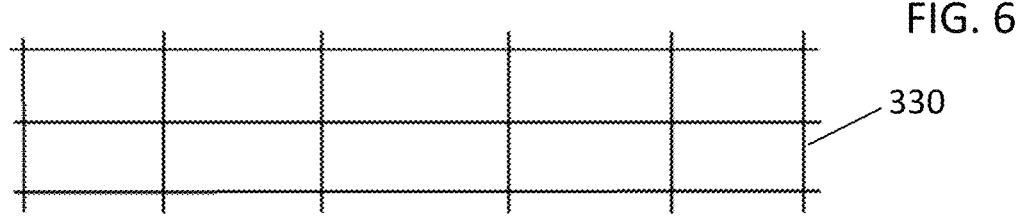
FIG. 7A illustrates one profile that exemplary fur agitation features can utilize, including a squared flat surface, in accordance with the present disclosure.
Figure 7A:
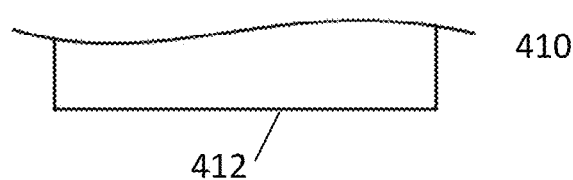
Figure 7B:
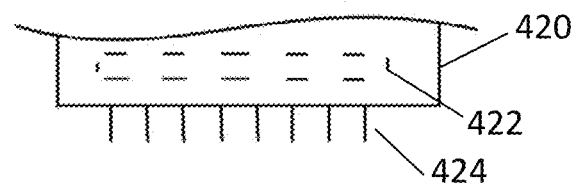
FIG. 7B illustrates one profile that exemplary fur agitation features can utilize, including a bristles extending from the surface of the feature, in accordance with the present disclosure.
Figure 7C:
FIG. 7C illustrates one profile that exemplary fur agitation features can utilize, including a jagged or roughened surface, in accordance with the present disclosure.
Figure 7D:
FIG. 7D illustrates one profile that exemplary fur agitation features can utilize, including a rounded surface, in accordance with the present disclosure.

Agitation features formed on polymerized plates, beads, or any other agitation feature form in accordance with the disclosure can take any of a number of shapes and configurations. FIGS. 7A-7D illustrate a number of non-limiting examples for fur agitation feature configurations. FIG. 7A illustrates one profile that exemplary fur agitation features can utilize, including a squared flat surface. Feature 410 includes a squared off flat surface 412. FIG. 7B illustrates one profile that exemplary fur agitation features can utilize, including a bristles extending from the surface of the feature. Feature 420 includes bristle base plate 422 molded within the feature, with bristles 424 extending from a face of feature 420. FIG. 7C illustrates one profile that exemplary fur agitation features can utilize, including a jagged or roughened surface. Feature 430 includes roughened surface 432 with a number of facets configured to increase gripping between the surface and the fur of the animal. FIG. 7D illustrates one profile that exemplary fur agitation features can utilize, including a rounded surface. Feature 440 includes a rounded surface 440. In one embodiment, features can include a coating including a tacky or semi-sticky material such as latex to increase friction or gripping between the features and fur.

Figure 8:
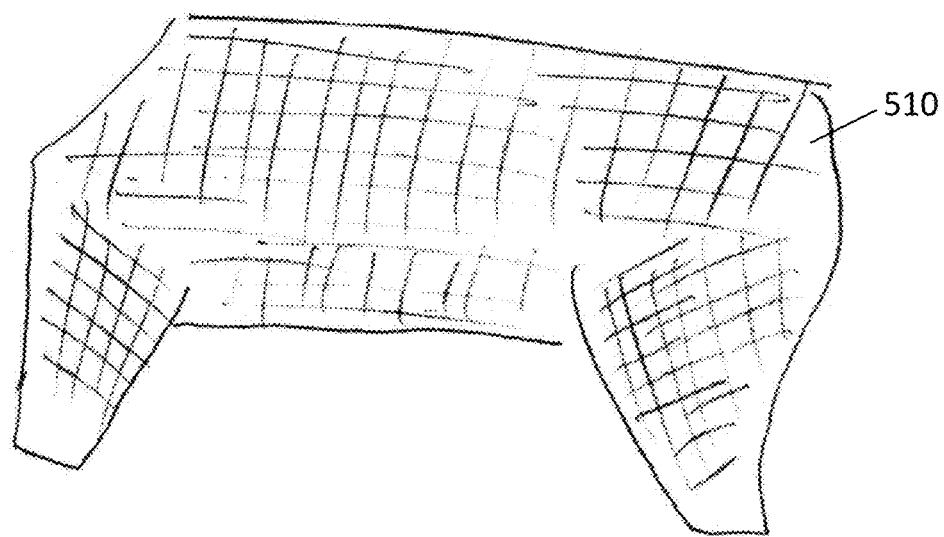
FIG. 8 illustrates an exemplary mesh layer illustrated in isolation from the fur agitation layer, in accordance with the present disclosure.

FIG. 8 illustrates an exemplary mesh layer illustrated in isolation from the fur agitation layer. Mesh layer 510 is illustrated. Mesh layer 510 can include one or more zippers, Velcro style closures, snaps, or other seams enabling one to fit the layer over the animal. The layer can fit separately upon the animal as a separate step from fitting a fur agitation layer upon the animal, or the two layers can be sewn or otherwise affixed together as a single garment.

Figure 9:
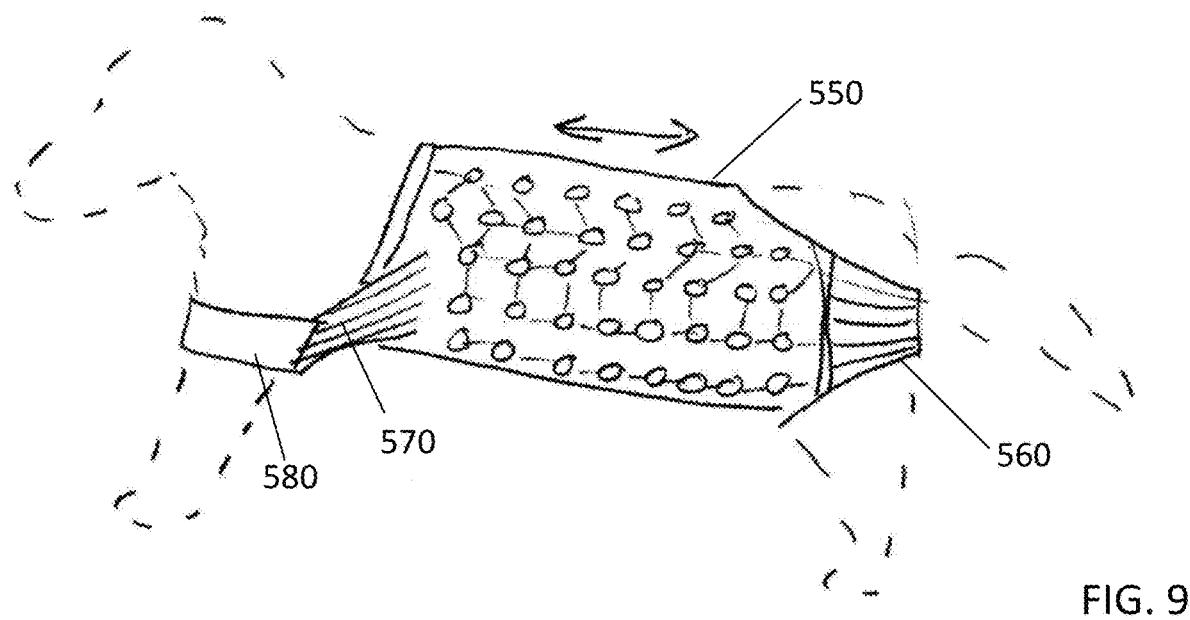
FIG. 9 illustrates an exemplary fur agitation layer illustrated in isolation from the mesh layer, in accordance with the present disclosure.

FIG. 9 illustrates an exemplary fur agitation layer illustrated in isolation from the mesh layer. A fur agitation layer can be situated upon the animal and simply let the natural motion of the animal create relative movement between the fur agitation layer and the fur of the animal. Fur agitation layer 550 is illustrated including layer activating features. Elastic band 560 is attached to the fur agitation layer 550 and is configured to stretched around a rear portion of an animal. Elastic band 570 is attached to fur agitation layer 550 and is configured to somehow attach to a front portion of the animal. In the embodiment of FIG. 9, a leg band 580 is illustrated configured to be fitted around a front leg of the animal. As the animal's front legs move in relation to the fur agitation layer 550, tension is created in elastic band 570, thereby creating a force upon layer 550 and causing it to move relative to the animal. When the animal is walking, such motion can be small, with a slight massaging motion taking place with relative movement of ¼ inch or less. When the animal either sits down on his rear legs or lays down, with all four legs resting on the ground, or the dog stretches, larger motions can take place, moving layer 550 an inch or more. In this way, the fur agitation layer can be activated by movement of the animal.

Figure 10:
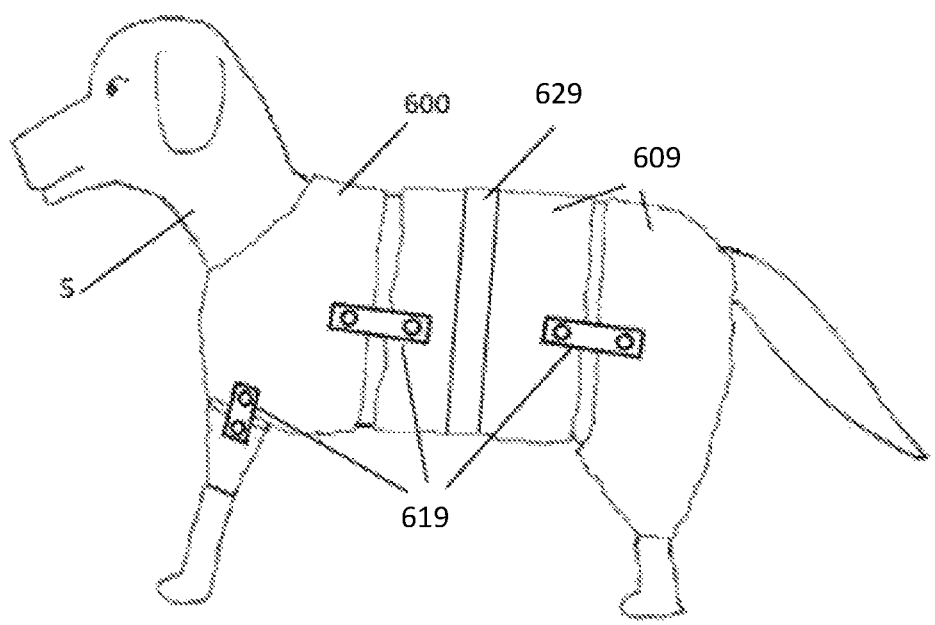
FIG. 10 illustrates an exemplary fur agitation layer including plates of polymerized material connected by bands facilitating movement of the plates, in accordance with the present disclosure.

FIG. 10 illustrates an exemplary fur agitation layer including plates of polymerized material connected by bands facilitating movement of the plates. Fur agitation layer 600 is illustrated and can include a mesh layer, for example, as illustrated in FIG. 8, either above or below the fur agitation layer 600. Fur agitation layer 600 includes a plurality of polymerized plates 609 constructed of flexible material and including fur activation features, such as the fur activation layer of FIG. 4. The plates 609 are connected by exemplary bands 619 which can be elastic. Movement of the animal 5 causes the plates 609 to move relative to each other, and the bands 619 help movement of any of the plates 609 to create movement in neighboring plates. The plates can be specially fitted for an animal or they can be offered in numbered sizes with a chart showing animal owners what size is likely to fit a particular pet. In one embodiment, constriction bands 629 can be used on one or more of the plates 609 to facilitate comfortable fitting of the plates to the animal and efficacy of the plates in agitating the fur to shed. Other methods of joining the plates can be utilized, for example, sewing sections of Spandex type material between plates, and the disclosure is not intended to be limited to the particular examples provide herein. The plates 609 of FIG. 10 are illustrated covering a substantial majority of the body of the animal. In other embodiments, for example, for use in warmer climates, plates covering 20 or 30% of the body of the animal at a time can be utilized to prevent the animal from overheating. More than one garment could be used sequentially in such a configuration to alternate areas on the animal to assist shedding. The plates can include holes to facilitate cool air to reach the skin of the animal.

The wearable, functional garment shown in the various figures is described for use on domesticated dogs. It will be appreciated that the garment could be made to fit a variety of dog of different sizes, as well as other domesticated animals, such as cats and other domesticated mammals that shed hair. It will be appreciated that more layers could be added to the garment for various purposes.

Figure 12:
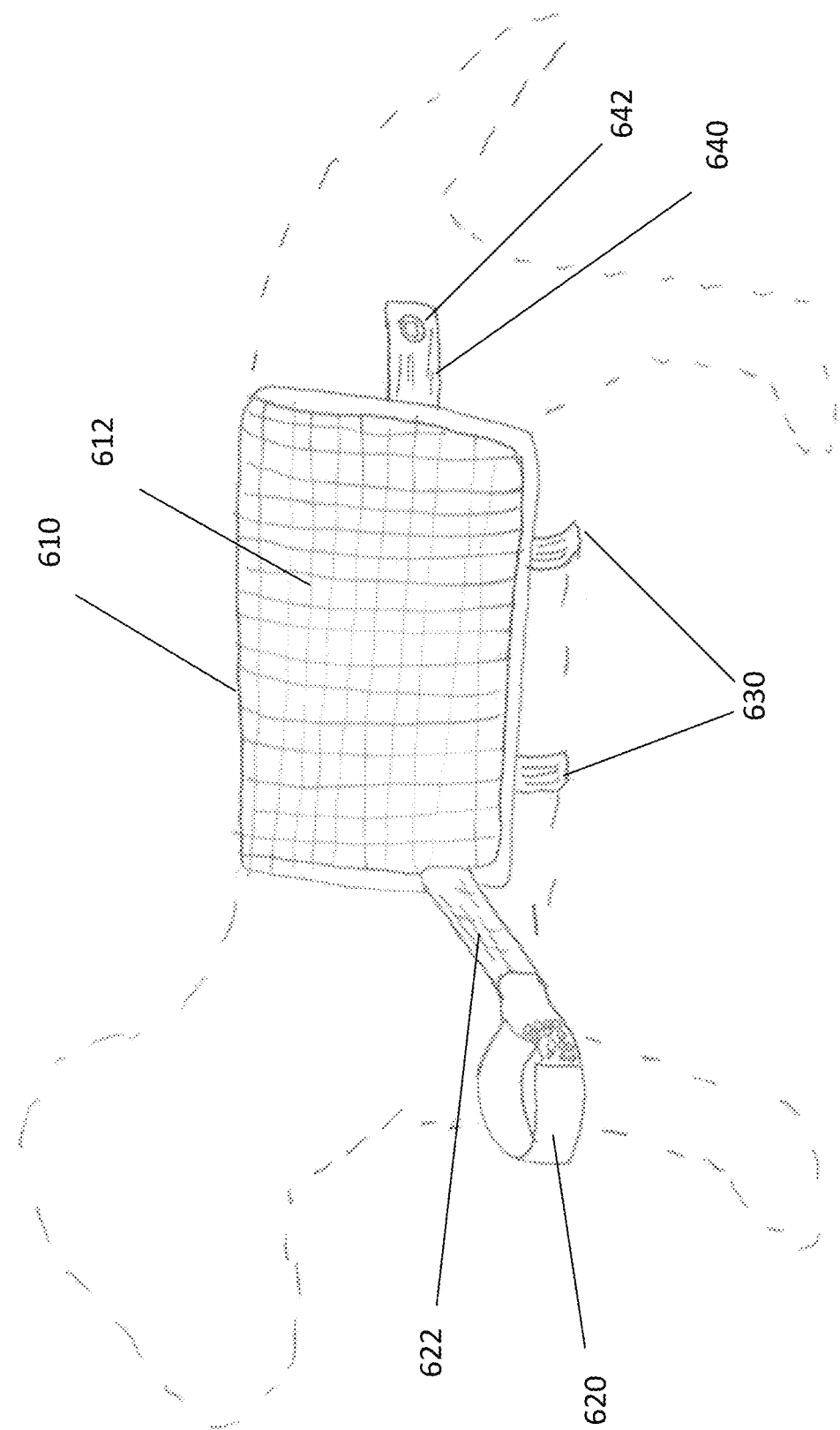
FIGS. 12-15 illustrate an alternative embodiment of exemplary layers that can be configured within the garment of FIG. 1, including a mesh layer close to the animal's fur and a second fur agitation layer resting above the mesh layer, wherein both layers include leg attachments configured to enable the two layers to shift in relation to each other based upon movement of the animal, in accordance with the present disclosure.

FIGS. 12-15 illustrate an alternative embodiment of exemplary layers that can be configured within the garment of FIG. 1, including a mesh layer close to the animal's fur and a second fur agitation layer resting above the mesh layer, wherein both layers include leg attachments configured to enable the two layers to shift in relation to each other based upon movement of the animal. FIG. 12 illustrates the mesh layer in side view. Mesh layer portion 610 is illustrated. An outline of a dog is provided with dotted lines for reference. Mesh layer portion 610 includes a criss-cross mesh 612 of threads or cords configured to hold detached fur strands close to the animal. Belly bands 630 are illustrated. Leg band 620 is connected to portion 610 with an strap section 622. Strap section 622 can be elastic or can be inelastic, depending upon how much movement of portion 610 relative to the dog is desired. Elastic band 640 is illustrated attached to a rear of portion 610 including an exemplary snap 642. Snap 642 is configured to be wrapped around a second outer layer and attached to that layer, while elasticity in elastic band 640 permits relative movement between portion 610 and the second outer layer. Leg bands illustrated herein are shown to include exemplary hook and loop (Velcro®) bands that can be adjustably fit to the circumference of the leg of the dog. Other similar methods of attaching leg bands are envisioned, such as elastic circular bands.

Figure 13:
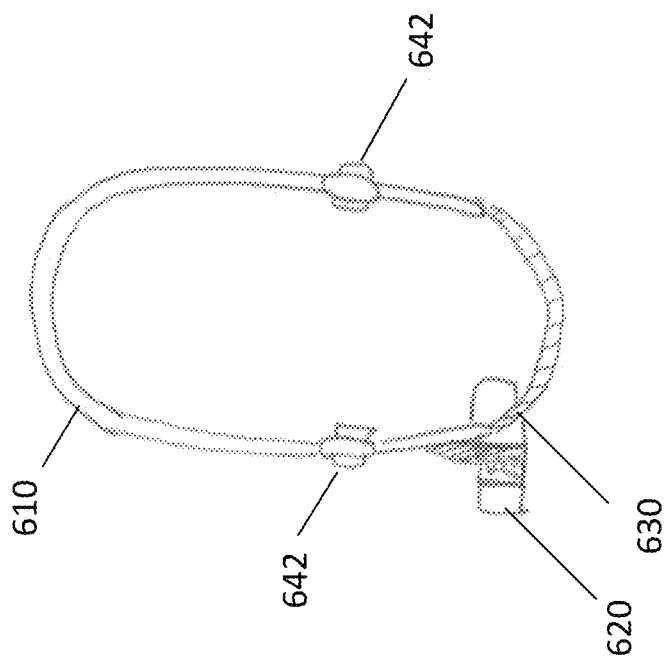

FIG. 13 illustrates the mesh layer from a rear view. Mesh layer portion 610 is illustrated including two snaps 642, one on each side of portion 610, belly band 630, and leg band 620.

Figure 14:
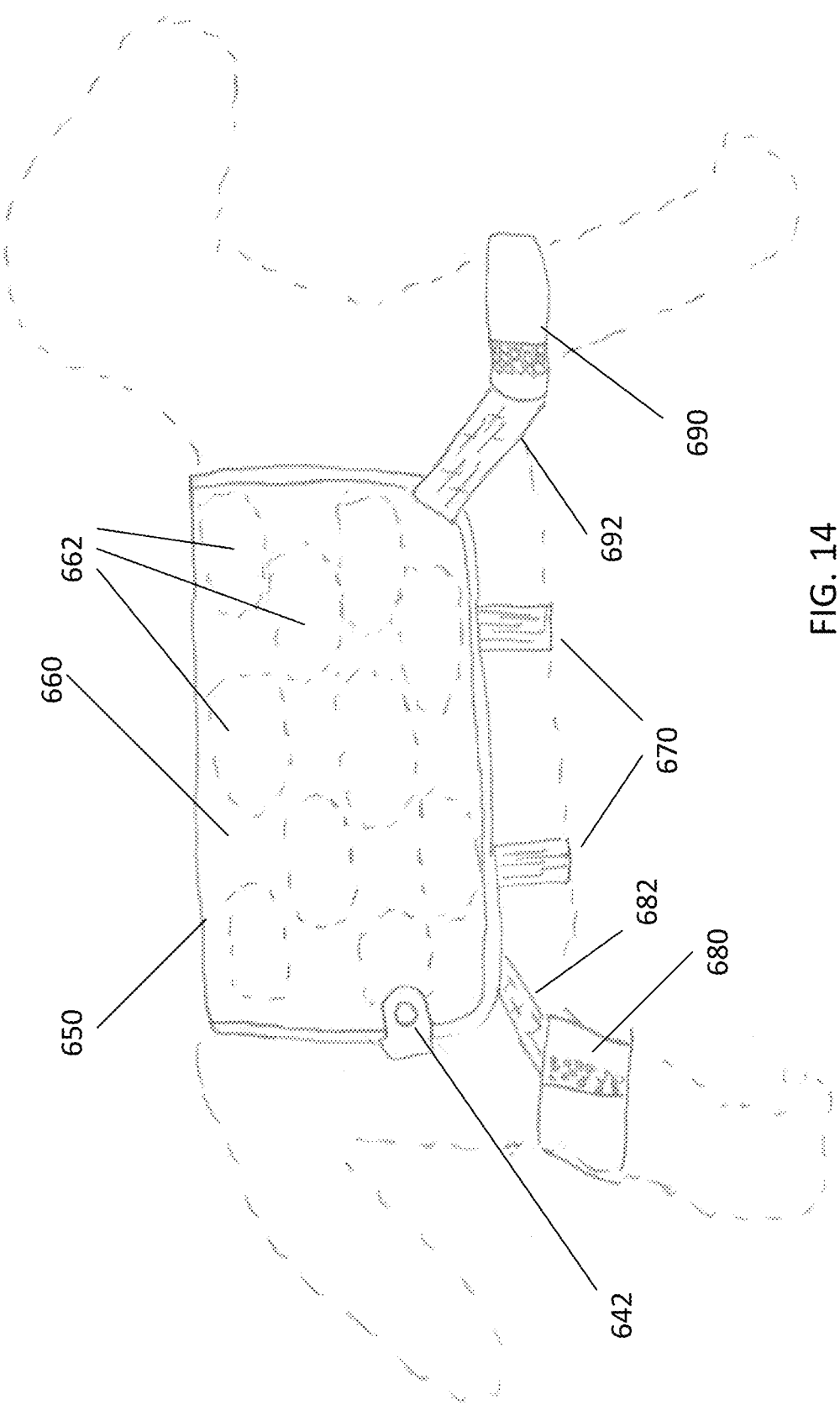

FIG. 14 illustrates the fur agitation layer. Fur agitation layer portion 650 is illustrated including panel 660, fur agitation features 662 embodied as oval shaped polymerized foam pads, leg bands 680 and 690, each connected to portion 650 with straps 682 and 692, respectively. Straps 682 and 692 can include different levels of elasticity based upon an amount of desired movement of portion 650 relative to portion 610 and the animal. Belly bands 670 are illustrated. Snap 642 is illustrated wrapping around and connecting to panel 660.

Figure 15:
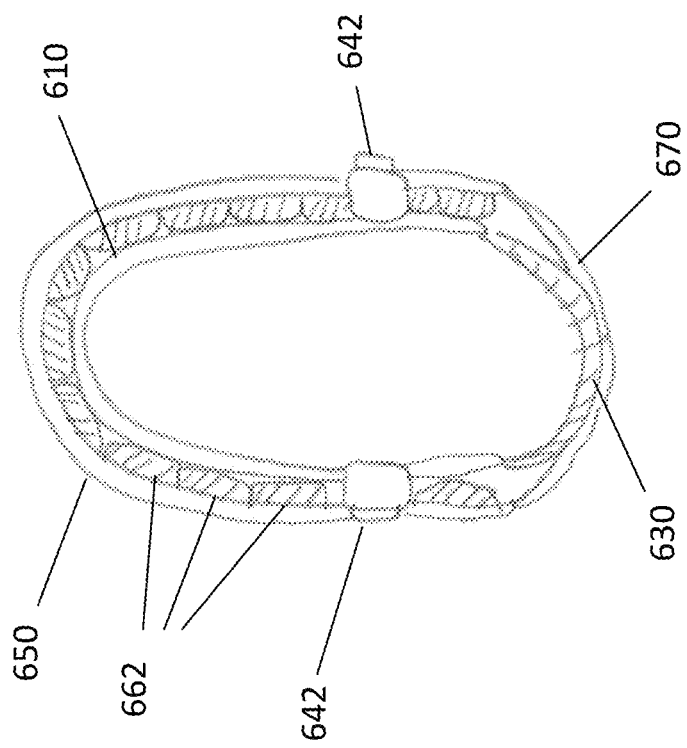

FIG. 15 illustrates both layers in a rear view. Mesh layer portion 610 is illustrated, with fur agitation layer portion 650 being installed over portion 610. Fur agitation features 662 are illustrated attached to portion 650 and in a position to message and rub against the animal through portion 610. Belly bands 630 and 670 are illustrated. Snaps 642 are illustrated connected to portion 610 and wrapping around and connecting to portion 650.

Figure 16:
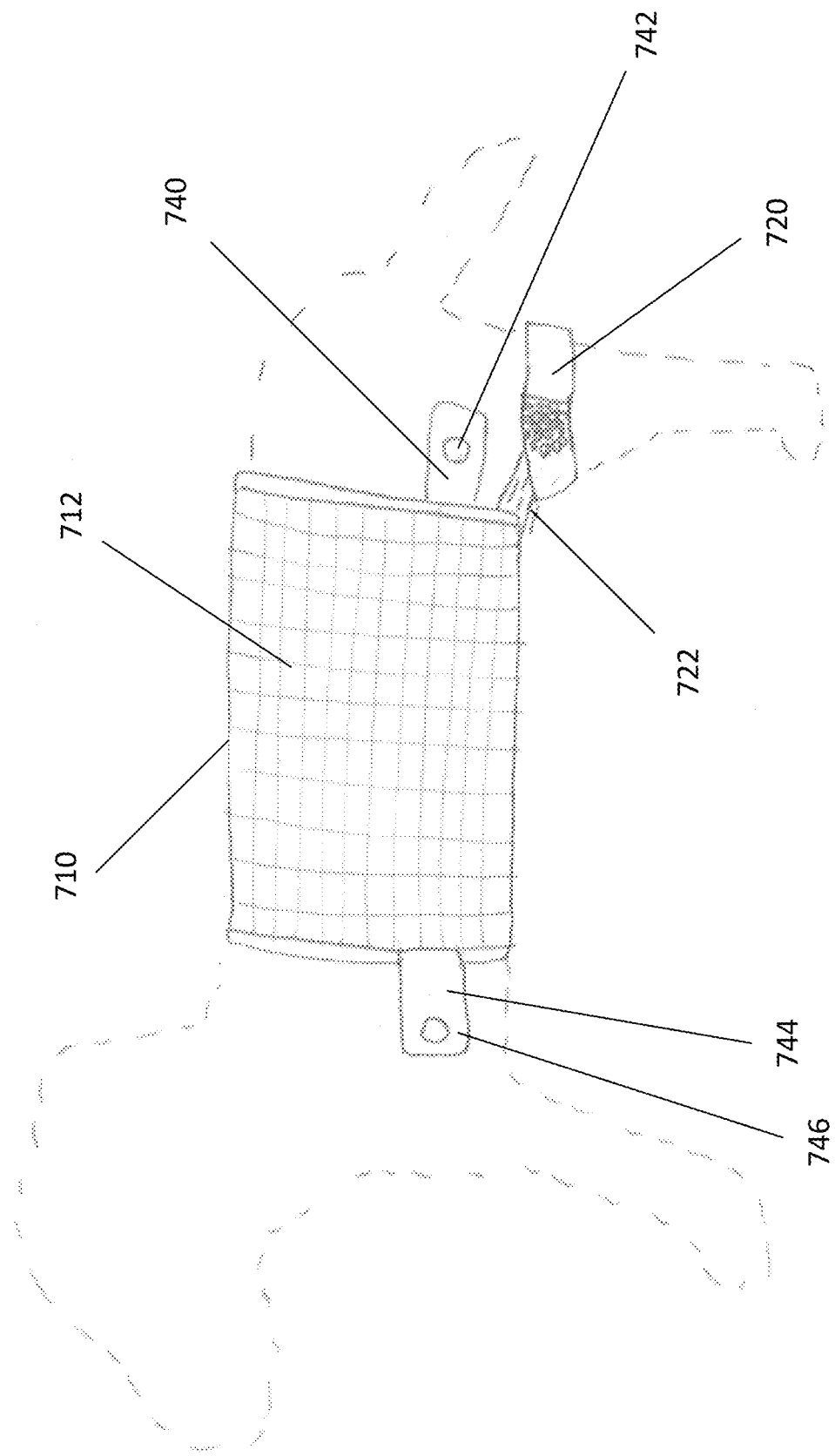
FIGS. 16 and 17 illustrates an alternative embodiment to the embodiment of FIGS. 12-15, with two layers configured to shift in relation to each other, in accordance with the present disclosure.
Figure 17:
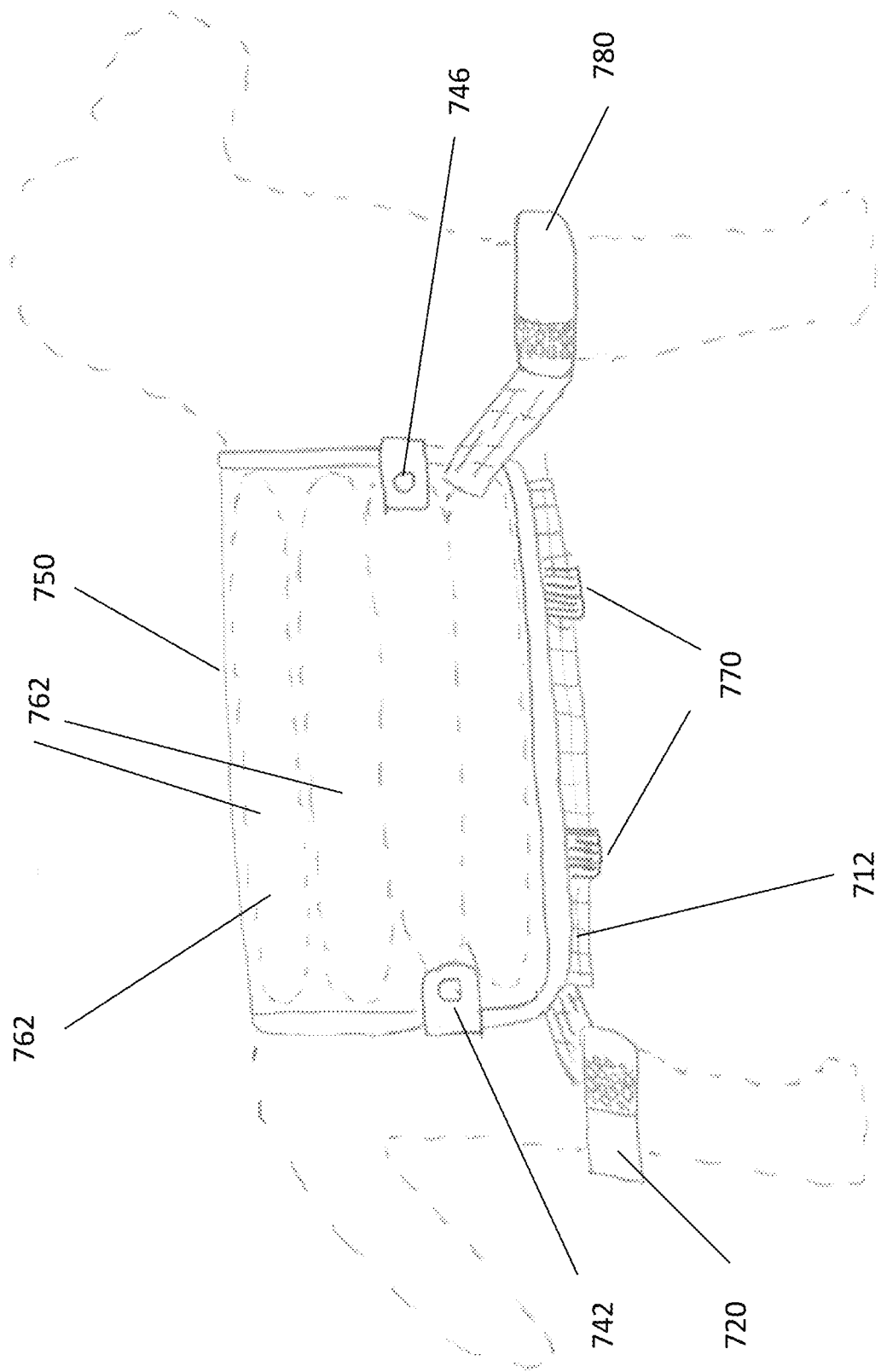

FIGS. 16 and 17 illustrates an alternative embodiment to the embodiment of FIGS. 12-15, with two layers configured to shift in relation to each other. The embodiment of FIGS. 16 and 17 differ from the embodiment of FIG. 12-15 in a number of ways, including which legs each portion is connected to. It will be appreciated that different leg connections will alter how much the layers shift in relation to the animal and in relation to each other.

FIG. 16 illustrates a mesh layer configured to rest close to the animal's fur with two leg attachments connecting to rear legs of the animal. Mesh layer portion 710 is illustrated including a tubular mesh layer 712 configured to be fit over the body of the animal. Mesh layer portion 710 can include some elasticity to enable the mesh layer portion 710 to be fit over dogs of similar but not exactly the same size and also to allow the dog to breathe comfortably. The tubular design can be better at holding in fur than the open version of FIG. 12 with belly bands. Elastic bands 740 and 744 are illustrated attached to snaps 742 and 746, respectively, and are configured to wrap around an outer layer and elastically connect the two layers. Leg band 720 is illustrated including strap 722. A second leg band 720 is connected similarly to a back side of portion 710. Strap 722 can include different levels of elasticity based upon a desired amount of movement between portion 710 and the animal.

FIG. 17 illustrates a fur agitation layer resting above the mesh layer with two leg attachments connecting to front legs of the animal. Fur agitation layer portion 750 is illustrated including panel 760 including a plurality of elongate fur agitation features 762 attached to portion 750. Tubular mesh layer 712 is visible under portion 750. Leg band 720 attached to the mesh layer portion of FIG. 16 is illustrated. Snaps 742 and 746 are illustrated connected to the mesh layer portion of FIG. 16 and wrapping around to connect with portion 750. Snaps 742 and 746 are exemplary and can be replaced by Velcro®, buttons, or other similar connection methods. Belly bands 770 are illustrated connecting portion 750 to the animal. Leg band 780 is illustrated connecting portion 750 to front legs of the animal. A second leg band 780 is attached to a back side of portion 750.

According to the embodiments of FIGS. 12-17, a first layer and a second layer can each be connected to different legs of the animal and connected with elastic bands or straps such that each of the layers can move relative to the animal and/or each other. FIGS. 12-17 illustrate the mesh layer closest to the animal. As described in the other figures, the fur agitation layer can instead be closer to the animal.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A device comprising a multi-layered animal garment configured to aid shedding of fur from an animal, the device comprising:
   a fur agitation layer comprising:
      a first leg band configured to extend around a front leg or a rear leg of the animal;
      a first strap attached at one end to the fur agitation layer and at an opposing end to the first leg band, wherein the first strap is configured to cause movement of the fur agitation layer relative to the animal in response to movement of the first leg band;
      an elastic band attached to a rear portion of the fur agitation layer, wherein the elastic band is configured to extend around a rear portion of the animal under a tail of the animal; and
      a plurality of fur agitation features configured to facilitate the shedding as the fur agitation layer moves relative to the fur; and a mesh layer configured to retain fur pieces shed from the fur, the mesh layer comprising:
  a second leg band configured to extend around the other of the front leg or the rear leg of the animal; and
  a second strap attached at one end to the mesh layer and at an opposing end to the second leg band, wherein the second strap is configured to cause movement of the mesh layer relative to the animal in response to movement of the second leg band,
wherein the fur agitation layer and the mesh layer move relative to each other based on movements of the first leg band and the second leg band, and
wherein the fur agitation layer and the mesh layer are elastically connected to each other.

2. The device of claim 1, wherein the mesh layer is disposed between the fur and the fur agitation layer.

3. The device of claim 2, wherein the mesh layer includes a grid pattern permitting the fur agitation features to project through the mesh layer.

4. The device of claim 2, wherein the mesh layer includes a grid pattern preventing the fur agitation features from projecting through the mesh layer.

5. The device of claim 1, wherein the fur agitation layer is disposed between the fur and the mesh layer.

6. The device of claim 1, wherein the fur agitation layer comprises a cloth base portion and a plurality of bristles oriented perpendicularly to the fur of the animal.

7. The device of claim 1, wherein the fur agitation layer comprises polymerized plates and bands, wherein one band connects each polymerized plate to an adjacent polymerized plate such that each of the bands is configured to transmit movement between adjacent polymerized plates.

8. The device of claim 7, wherein the fur agitation features comprise raised sections on the polymerized plates.

9. The device of claim 8, wherein the raised sections include bristles.

10. The device of claim 8, wherein the raised sections include a faceted surface.

11. The device of claim 8, wherein the raised sections include a rounded surface.

12. A device comprising a multi-layered animal garment configured to aid shedding of fur from an animal, the device comprising:
  a first mesh layer comprising:
    a first leg band configured to extend around a front leg or a rear leg of the animal; and
    a first strap attached at one end to the first mesh layer and at an opposing end to the first leg band, wherein the first strap is configured to cause movement of the first mesh layer relative to the animal in response to movement of the first leg band; and
  a second mesh layer comprising:
    strands arranged in a grid pattern;
    polymerized beads, wherein each of the polymerized beads is located at an intersection of two of the strands;
    a second leg band configured to extend around the other of the front leg or the rear leg of the animal; and
    a second strap attached at one end to the second mesh layer and at an opposing end to the second leg band, wherein the second strap is configured to cause movement of the second mesh layer relative to the animal in response to movement of the second leg band,
  wherein the first mesh layer and the second mesh layer move relative to each other based on movements of the first leg band and the second leg band, and
  wherein the polymerized beads are configured to facilitate the shedding as the second mesh layer moves relative to the fur of the animal.

13. The device of claim 12, wherein the second mesh layer is disposed between the first mesh layer and the fur of the animal.

14. The device of claim 12, wherein the first mesh layer is disposed between the second mesh layer and the fur of the animal.

15. The device of claim 12, comprising an elastic attachment band having one end attached to a rear portion of the first mesh layer and an opposing end attached to a rear portion of the second mesh layer, wherein the elastic attachment band is configured to allow relative movement between the first mesh layer and the second mesh layer.

16. The device of claim 12, wherein the second mesh layer comprises an elastic band attached to a rear portion of the second mesh layer, wherein the elastic band is configured to extend around a rear portion of the animal under a tail of the animal.

17. The device of claim 12, wherein the first mesh layer or the second mesh layer is tubular and configured to fit over a body of the animal.

18. A device comprising a multi-layered animal garment configured to aid shedding of fur from an animal, the device comprising:
  a fur agitation layer comprising polymerized plates and bands, wherein:
    one of the polymerized plates extends around a front leg or a rear leg of the animal;
    one band connects each polymerized plate to an adjacent polymerized plate;
    each of the bands is configured to transmit movement between adjacent polymerized plates; and
    each of the polymerized plates includes a plurality of fur agitation features configured to facilitate the shedding as the fur agitation layer moves relative to the fur; and
  a mesh layer elastically attached to the fur agitation layer and configured to retain fur pieces shed from the fur, the mesh layer comprising:
    a leg band configured to extend around the other of the front leg or the rear leg of the animal; and
    a strap attached at one end to the mesh layer and at an opposing end to the leg band, wherein the strap is configured to cause movement of the mesh layer relative to the animal in response to movement of the leg band,
  wherein the fur agitation layer and the mesh layer move relative to each other based on movements of the polymerized plates and the leg band.

19. The device of claim 18, comprising a constriction band configured to extend around one of the polymerized plates and a body of the animal to conform a shape of the one of the polymerized plates to a shape of the body of the animal.

20. The device of claim 1, comprising an elastic attachment band having one end attached to a rear portion of the fur agitation layer and an opposing end attached to the mesh layer, wherein the elastic attachment band is configured to allow relative movement between the fur agitation layer and the mesh layer.

* * * * *